Patented Mar. 23, 1943

2,314,843

UNITED STATES PATENT OFFICE 2,314,843

PROCESS OF PRODUCING NICOTINAMIDE

Martin E. Hultquist, North Plainfield, N. J., assignor to American Cyanamid Company, New York, N. Y., a corporation of Maine No Drawing. Application September 12, 1941, Serial No. 410,581

4 Claims. (Cl. 260—295)

This invention relates to an improved process of producing nicotinamide.

Nicotinamide has been used extensively in vitamin therapy as a cure for or preventative of pellagra. In the past nicotinamide has been prepared by treating an ester of nicotinic acid with ammonia. This process takes a long time and the yields are low. More recently it has been proposed to prepare nicotinamide by melting nicotinic acid and reacting it with dry ammonia at about 230° C. The process is slow, taking over four hours to get 60% concentration and considerable decomposition takes place resulting in material lowering of the yield.

According to the present invention, nicotinamide is prepared by reacting nicotinic acid with urea, with or without additional ammonia. Better yields are obtained, the reaction product is of better quality, and recovery of the nicotinamide from the reaction mixture is simplified.

The conditions of reaction in the process of the present invention are not critical. Temperatures may be used over a wide range of from around 180° C. to above 250° C. In general, it is desirable to start out at a temperature near the lower figure and raise it after the reaction has proceeded for some time.

The proportions of urea to nicotinic acid are not critical, but it has been found that the reaction with the urea, under ordinary operating conditions, does not proceed to completion and it is necessary after all of the urea has reacted to continue the reaction, preferably at a higher temperature with ammonia. It is undesirable to attempt to use sufficient urea to be molecularly equivalent to the nicotinic acid because excess urea or even an amount of urea molecularly equivalent tends to form some by-products. It is therefore preferable to operate with an excess of nicotinic acid and complete the reaction with ammonia. The best results are obtained with an amount of urea from one-half molecular equivalent to nearly molecular equivalent. When less than one-half mol is used, the yields fall off, and when one mol is used, the purity is not quite as high as when somewhat smaller amounts are employed.

The present invention is not intended to be limited to any particular theory of action, but it seems probable that the reaction proceeds by a condensation of the nicotinic acid with the urea followed by splitting off of carbon dioxide and ammonia which are evolved from the reaction mixture.

Although the present invention results in a much higher production and yield of a purer nicotinamide, it is sometimes necessary to effect purification as the reaction does not proceed quite to completion and some unreacted nicotinic acid has to be recovered. An additional or subsidiary feature of the present invention deals with the method of purification and recovery of the unreacted nicotinic acid. I prefer to remove unreacted nicotinic acid by dissolving the reaction mixture in a suitable organic solvent such as a lower monohydric paraffin alcohol followed by precipitating an insoluble nicotinic acid salt with an alkaline earth metal base preferably calcium hydroxide. After filtration to remove the insoluble nicotinate, the nicotinamide may be purified by treatment with activated carbon and crystallization from solvents such as alcohol, ester or hydrocarbon or a mixture.

The invention will be described in greater detail in the following specific examples which illustrate typical modifications of the process. The parts are by weight.

Example 1

A mixture of 123 parts (1 mol) nicotinic acid, 60 parts (1 mol) urea, and 5 parts of 28% ammonia water were mixed thoroughly and added to a vessel equipped with a stirrer and set in an oil bath at 220–230° C. over 40 minutes. The inside temperature was 180–210° C. during this time; ammonia and carbon dioxide were evolved. The mixture was then heated to 220–230° C. inside temperature for 5 hours. The dark brown mixture was cooled to 150° C. and poured into 200 parts of 3A denatured ethyl alcohol. A small amount of alcohol insoluble impurity, probably from decomposition of urea, was filtered off. The light brown solution found to contain 11.2 parts nicotinic acid by titration of a sample with sodium hydroxide, using phenolphthalein indicator, was treated while at 60–70° C. with 4 parts calcium hydroxide. The calcium nicotinate, after filtration and drying, amounted to 13 parts. This is a recovery of 8.1% of the nicotinic acid used at the start. The alcohol solution of amide after treating with a decolorizing carbon, clarifying, and evaporation to dryness, gave 97 parts of light yellow nicotinamide melting at 122.5–127° C. This corresponds to a yield of 79.4%. The product is purer than that obtained by earlier processes and can be still further purified by recrystallization from alcohol.

Example 2

A mixture of 123 parts (1 mol) nicotinic acid and 30 parts urea (0.5 mol) was added over 20 minutes to a vessel equipped with a stirrer and set in an oil bath at 240–250° C. The internal temperature was 180–210° C. during this time. The mixture was heated one hour at 220–230° C., at the end of which time evolution of carbon dioxide and ammonia had almost stopped. A stream of anhydrous ammonia was then passed through the mixture held at 230–235° C. for four hours. The dark brown liquid was cooled to 150° C. and poured into 200 parts 3A denatured ethyl alcohol. No alcohol insoluble matter separated, so that the solution was treated with 4.8 parts calcium hydroxide to precipitate the 16 parts (13% of the starting amount) nicotinic acid as calcium nicotinate. 5 parts of a decolorizing carbon was added and the solution was clarified to give a very light yellow solution which, on evaporation to dryness on the steam bath, gave 98.5 parts light yellow nicotinamide melting at 126–128.5° C. This corresponds to a yield of 80.5% nicotinamide and 13% recovery of nicotinic acid.

Example 3

A mixture of 123 parts (1 mol) nicotinic acid and 45 parts (0.75 mol) urea were added to a vessel equipped with a stirrer and set in an oil bath at 240–250° C. over 20 minutes. The mixture was then heated to 230–235° C. internal temperature and a slow stream of anhydrous ammonia was passed through at this temperature for 2 hours. A sample was removed and found to contain 12% unconverted nicotinic acid by titration with sodium hydroxide, using phenolphthalein as indicator. This mixture was cooled to 150° C. and was poured into 200 parts 3A denatured ethyl alcohol. A small amount of alcohol insoluble impurity separated on standing and was filtered off. This amounted to 3.7 parts and contained 1 part nicotinic acid.

The filtrate was treated with 4.3 parts calcium hydroxide to precipitate the 13.5 parts remaining nicotinic acid as calcium nicotinate. 5 parts of a decolorizing carbon was added, the mixture was clarified to give a light yellow solution. After evaporation on a steam bath there was obtained 95 parts light yellow nicotinamide melting at 124–128° C. This corresponds to a yield of 77.8% nicotinamide and 12% recovered nicotinic acid (as calcium salt).

Example 4

A mixture of 61.5 parts (0.5 mol) nicotinic acid and 30 parts (0.5 mol) urea was heated with stirring to 220–230° C. for 4 hours. Much ammonia and carbon dioxide were evolved. The material was distilled at 170–185° C. under 5 mm. pressure to give 51 parts of almost colorless material, melting at 117–122° C. Analysis by sodium hydroxide titration showed this to be 12% nicotinic acid. This corresponds to a yield of 45 parts or 73.7% of theory of nicotinamide and 6.1 parts or 10% recovered nicotinic acid.

Example 5

A mixture of 307.5 parts (2.5 mols) nicotinic acid and 75 parts (1.25 mols) urea was added with stirring to a flask set in an oil bath at 250–260° C. over 30 minutes. The internal temperature was maintained at 200–210° C. during this time. After all the material had been melted, the mixture was heated to and held at 225–235°, and a stream of ammonia gas was bubbled through at a rate of about 17 grams per hour for four hours. At this time the mixture was analyzed and found to be 15% nicotinic acid.

This brown liquid was then cooled to 150° and poured into 600 parts special denatured 2B ethyl alcohol, and 13.5 parts calcium hydroxide and 11 parts of a decolorizing carbon. This mixture was stirred 30 minutes at 60–65° and was then clarified. This light yellow solution was then cooled to 5°, filtered, and washed with two forty part portions 2B alcohol at 5°. The mother liquor was then distilled down to 160 parts, 3 parts decolorizing carbon was added, and the solution was clarified at 60–65° C. and cooled to 5°. The slightly yellow nicotinamide was filtered off, and washed with 40 parts 2B ethyl alcohol at 5° C.

The two portions nicotinamide were combined and dissolved in 320 parts 2B alcohol at 60–65°, 6 parts of a decolorizing carbon was added, and the hot solution was clarified to give an almost water-white solution. On cooling to 5° filtering, washing with two 20 parts 2B alcohol, and drying at 70°, there was obtained 156 parts of a colorless nicotinamide melting at 129.8–131°.

Further good material could readily be obtained by evaporation of mother liquors and re-crystallization from 2B alcohol.

I claim:

1. A method of preparing nicotinamide which comprises reacting nicotinic acid and urea at a temperature from 180° C. to 250° C.

2. A method of preparing nicotinamide which comprises reacting nicotinic acid and urea from one-half to one mol per mol of nicotinic acid at a temperature from 180° C. to 250° C.

3. A method according to claim 1 in which the nicotinic acid and urea are reacted at a temperature of 180° C. to 210° C. until evolution of ammonia and carbon dioxide substantially ceases and then the reaction is continued with the addition of ammonia at a temperature from 220° C. to 250° C.

4. A method according to claim 2 in which the nicotinic acid and urea are reacted at a temperature of 180° C. to 210° C. until evolution of ammonia and carbon dioxide substantially ceases and then the reaction is continued with the addition of ammonia at a temperature from 220° C. to 250° C.

MARTIN E. HULTQUIST.